United States Patent
Min et al.

(10) Patent No.: US 10,902,855 B2
(45) Date of Patent: Jan. 26, 2021

(54) METHODS AND DEVICES FOR NEGOTIATING PERFORMANCE OF CONTROL OPERATIONS WITH ACOUSTIC SIGNALS

(71) Applicant: Motorola Mobility LLC, Chicago, IL (US)

(72) Inventors: Jun-Ki Min, Chicago, IL (US); Sudhir Vissa, Bensenville, IL (US); Nikhil Ambha Madhusudhana, Chicago, IL (US); Vivek Tyagi, Chicago, IL (US); Mir Farooq Ali, Rolling Meadows, IL (US)

(73) Assignee: Motorola Mobility LLC, Chicago, IL (US)

( * ) Notice: Subject to any disclaimer, the term of this patent is extended or adjusted under 35 U.S.C. 154(b) by 457 days.

(21) Appl. No.: 15/589,714

(22) Filed: May 8, 2017

(65) Prior Publication Data

US 2018/0322881 A1 Nov. 8, 2018

(51) Int. Cl.
| | | |
|---|---|---|
| *G10L 15/32* | (2013.01) | |
| *G10L 15/22* | (2006.01) | |
| *H04B 11/00* | (2006.01) | |
| *G06F 3/16* | (2006.01) | |

(52) U.S. Cl.
CPC .............. *G10L 15/32* (2013.01); *G06F 3/165* (2013.01); *G06F 3/167* (2013.01); *G10L 15/22* (2013.01); *H04B 11/00* (2013.01); *G10L 2015/223* (2013.01); *G10L 2015/228* (2013.01)

(58) Field of Classification Search
CPC ...................................................... G10L 21/232
USPC ......................................................... 704/275
See application file for complete search history.

(56) References Cited

U.S. PATENT DOCUMENTS

| | | | |
|---|---|---|---|
| 2004/0082383 A1 | 4/2004 | Muncaster et al. | |
| 2008/0004904 A1* | 1/2008 | Tran | A61B 5/0006 705/2 |
| 2009/0158040 A1 | 6/2009 | Chaudhary et al. | |
| 2013/0183944 A1* | 7/2013 | Mozer | H04L 12/282 455/414.1 |
| 2015/0006184 A1* | 1/2015 | Marti | G10L 15/22 704/275 |
| 2015/0126845 A1* | 5/2015 | Jin | G02B 27/017 600/383 |
| 2015/0254058 A1* | 9/2015 | Klein | G06F 3/167 704/275 |
| 2015/0279356 A1* | 10/2015 | Lee | G10L 15/24 704/251 |
| 2016/0028802 A1* | 1/2016 | Balasingh | H04L 67/1046 709/224 |
| 2016/0150392 A1* | 5/2016 | Jung | H04W 8/005 455/450 |
| 2016/0195856 A1* | 7/2016 | Spero | G06N 5/046 700/90 |

(Continued)

*Primary Examiner* — Bhavesh M Mehta
*Assistant Examiner* — Timothy Nguyen
(74) *Attorney, Agent, or Firm* — Philip H. Burrus, IV

(57) ABSTRACT

An electronic device includes one or more processors, an audio interface, operable with the one or more processors, and a voice interface engine. The audio interface receives first acoustic signals identifying a control operation for the one or more processors. The one or more processors cause the audio interface to exchange second acoustic signals with at least one other electronic device, thereby negotiating which device will perform the control operation.

20 Claims, 7 Drawing Sheets

(56) References Cited

U.S. PATENT DOCUMENTS

2016/0234711 A1    8/2016   Wang et al.
2016/0365101 A1   12/2016   Foy et al.
2017/0099555 A1    4/2017   Singhvi et al.
2018/0096696 A1*   4/2018   Mixter .................... G10L 15/20

* cited by examiner

METHODS AND DEVICES FOR NEGOTIATING PERFORMANCE OF CONTROL OPERATIONS WITH ACOUSTIC SIGNALS

BACKGROUND

Technical Field

This disclosure relates generally to electronic devices, and more particularly to electronic devices that are controllable by voice commands.

Background Art

Personal electronic devices, such as smart phones, are incredibly popular. These devices are used for many different purposes including, but not limited to, voice communications and data communications for text messaging, Internet browsing, commerce such as banking, and social networking. As the technology of these devices has advanced, so too has their feature set. For example, not too long ago all electronic devices had physical keypads. Today touch sensitive displays are more frequently seen as user interface devices. Similarly, some devices are equipped with voice recognition that allows a user to speak commands to a device instead of typing them. As more devices improve in their ability to quickly and accurately process speech, confusion can occur regarding which device will perform which command. It would be advantageous to have an improved, voice controllable, electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
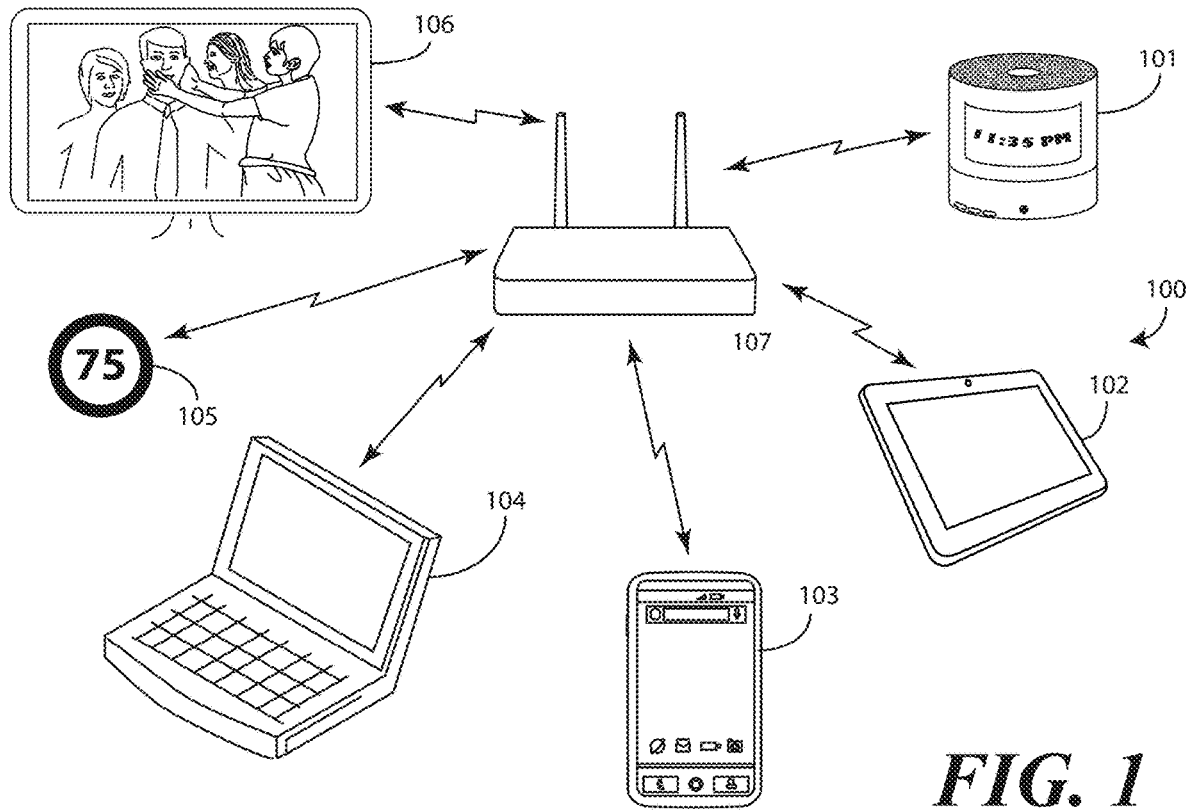
FIG. 1 illustrates one or more explanatory electronic devices configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to acoustically negotiating between electronic devices which device will respond to a voice command. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of acoustically negotiating which electronic device will perform a general voice command received by multiple devices as described herein. The non-processor circuits may include, but are not limited to, a radio receiver, a radio transmitter, signal drivers, clock circuits, power source circuits, and user input devices such as a microphone and a loudspeaker. As such, these functions may be interpreted as steps of a method to perform acoustic determination of prioritization of devices and/or a selection of which electronic device will perform a particular control operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

As noted above, many electronic devices now include "voice assistants." These voice assistants allow a user to interact with the device by delivering voice commands to the device instead of touch input. The inclusion of voice assistants, and the corresponding use of voice commands to control electronic devices, is quickly becoming a common way to interact with and/or control an electronic device.

In traditional voice assistant applications, a user might press a button or speak a "trigger" phrase prior to delivering a voice command. A trigger phrase is a word or phrase that is seldom used in everyday speech. When spoken, the trigger phrase alerts the electronic device that a voice command will soon follows. For instance, a user might say, "Okay, marshmallow, tell me what time it is," where "marshmallow" is the trigger phrase. When this occurs, the voice assistant begins analyzing speech to identify the voice command so an appropriate response can be delivered. In this example, the response would be audibly delivering the time of day.

Embodiments of the disclosure contemplate that the necessity to use a trigger word or physically touch the device reduces the "natural" communication style that is desirable when using voice assistants. Continuing the example from above, it is quite unnatural to say, "Okay, marshmallow" prior to delivering a voice command. Moreover, when trigger phrases or command sequences are long or complicated, a user might even forget them. For instance, having to say, "Okay, marshmallow, tell illumination station three to activate light seven," just to turn on a lamp will result in reduced usage of the voice assistant.

At the same time, embodiments of the disclosure contemplate that simplifying the language used to interact with voice assistants creates its own problems. In an environment where multiple devices are operational, each with its own voice assistant, a command such as "turn on some music" can create confusion. If one device is a smart television, another is a smart speaker, another is a smart radio, another is a computer, and another is a smartphone, each device is capable of playing music. Embodiments of the disclosure contemplate that it can be frustrating to have multiple devices begin playing multiple songs at the same time. A cacophony results.

Embodiments of the disclosure further contemplate that in many situations these devices will not electronically communicate with each other. While some may be able to exchange information in a peer-to-peer network, it is frequently the case that a smart light bulb from manufacturer 1 may not "talk" electronically to a smart speaker. However, embodiments of the disclosure contemplate that each device with a voice assistant has, by definition, two components: a microphone to receive voice commands from a user and a loudspeaker with which to respond to these voice commands.

Advantageously, embodiments of the disclosure use these components, i.e., the microphone and loudspeaker, in an acoustic method of negotiating which device will respond to a voice command when multiple devices receive that same voice command. In one or more embodiments, one or more electronic devices receive, with an audio interface, audible acoustic signals identifying a user voice command requesting a single electronic device to perform a control operation. When this occurs, in one or more embodiments the devices negotiate, by exchanging inaudible acoustic signals, e.g., ultrasound acoustic signals, to determine which device will perform the control operation. Once this negotiation is complete, a selected electronic device will perform the control operation. Advantageously, this prevents multiple devices from responding to a voice command, thereby avoiding the "cacophony" situation described above.

In one or more embodiments, a method includes the steps of identifying the presence of locally disposed electronic devices that include voice assistants by transmitting and receiving inaudible acoustic signals such as ultrasound acoustic signals, infrasound acoustic signals, or other acoustic waves that are outside of the human hearing range that is generally considered to be between 20 and 20,000 Hertz. In one or more embodiments, when other electronic devices are discovered, they are capable of communicating with each other using these inaudible acoustic signals emitted by their loudspeaker(s) and received by their microphone(s).

When a voice command is received by the devices, or in some embodiments before a voice command is received, the electronic devices use the inaudible acoustic signals to negotiate which electronic device will respond to a particular voice command. Once the negotiation is complete, in one or more embodiments only a single electronic device will respond to the voice command by performing a control operation. The other electronic devices will release the responsibility of responding.

The negotiation can be performed on any of a number of factors. These include the hardware capabilities of each device, the content of the voice command, the latency with which the control operation can be performed, the energy storage status of a battery or other power source of each device, and so forth. These and other examples of negotiating functions will be described below with reference to FIG. 7. Still others will be obvious to those of ordinary skill in the art having the benefit of this disclosure.

In addition to determining which electronic device will respond to a voice command, the inaudible acoustic communication between devices can be used in other ways as well. Illustrating by example, in one or more embodiments each electronic device can reduce the volume of the inaudible acoustic signals to limit the range within which other electronic devices can engage in the negotiation. Advantageously, this allows a user to define zones within which various electronic devices will communicate. If, for example, a user wants only devices on the second floor of a home to communicate with each other to determine which will respond to a voice command, this can be done by limiting the volume of the inaudible acoustic signals, thereby limiting the range within which such signals can be reliably received. Other advantages will be described below. Still others will be obvious to those of ordinary skill in the art having the benefit of this disclosure.

Turning now to FIG. 1, illustrated therein are one or more electronic devices 101,102,103,104,105,106 that are operating in a network 100. The network 100 includes a hub 107, which is a router in this illustrative embodiment. The network 100 of FIG. 1 is an illustration of what might be a home network, office network, or other network in which the electronic devices 101,102,103,104,105,106 communicate with the hub 107 via a predefined communication protocol, such as that set forth in the IEEE 802.11 standard. The network 100 defines a local area network (LAN), and the hub 107 serves as a gateway to provide access to other networks, such as the Internet, for the electronic devices 101,102,103,104,105,106.

In this illustration, electronic device 101 is a music player. Electronic device 102 is a tablet computer. Electronic device 103 is a smartphone. Electronic device 104 is a laptop computer. Electronic device 105 is a smart thermostat. Electronic device 106 is a smart television. In this illustrative embodiment, each electronic device 101,102,103,104, 105,106 includes a voice assistant. Accordingly, a user can control each of the electronic devices 101,102,103,104,105, 106 using voice commands.

Figure 2:
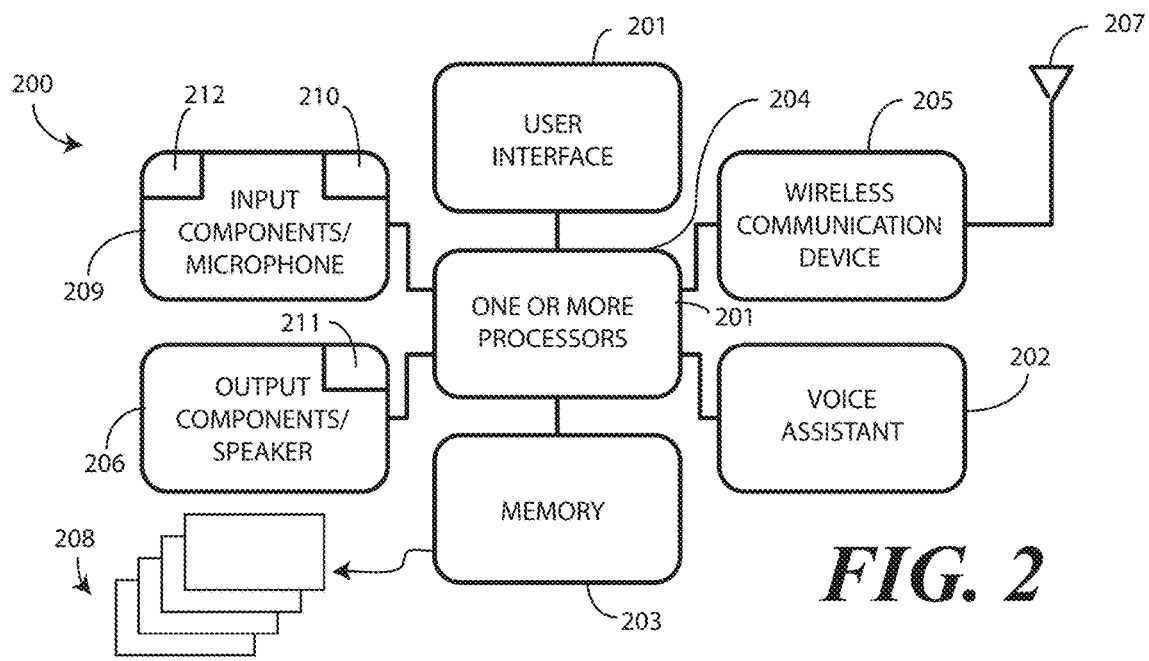
FIG. 2 illustrates an explanatory schematic block diagram of an illustrative electronic device configured in accordance with one or more embodiments of the disclosure.

Turning now to FIG. 2, illustrated therein is a schematic block diagram 200 illustrating components common to each of the electronic devices (101,102,103,104,105,106) shown in FIG. 1. Those of ordinary skill in the art understand that a smart television and a smart thermostat will inherently have different processors, peripheral components, input and output connectors, and so forth. However, to operate as a smart device with a voice assistant, some components will offer common features. The object of FIG. 2 is to show, generally, the components offering these common features across devices. Accordingly, some components unique to each device are not shown due to the fact that they will be readily obvious to those of ordinary skill in the art.

A user interface 201 is configured to receive user input. The user interface 201 can include a display to provide visual output, images, or other visible indicia to a user. For example, the user interface 201 can include an organic light emitting diode (OLED) device to render the images or visible indicia. The user interface 201 can include a touch sensor, force sensor, or other sensor to receive user input as well.

In one or more embodiments, the user interface 201 includes a voice interface engine 202. The voice interface engine 202 can include hardware, executable code, and speech monitor executable code in one embodiment so as to function as a voice assistant. The voice interface engine 202 can include, stored in memory 203, basic speech models, trained speech models, or other modules that are used by the voice interface engine 202 to receive and identify voice commands that are received with audio input captured by an audio capture device. In one embodiment, the voice interface engine 202 can include a voice recognition engine. Regardless of the specific implementation utilized in the various embodiments, the voice interface engine 202 can access various speech models to identify speech commands.

In one embodiment, the voice interface engine 202 is configured to implement a voice control feature that allows a user to speak a specific device command to cause the one or more processors 204 to execute a control operation. For example, the user may say, "How tall is the Willis Tower?" This question comprises a voice command requesting the one or more processors 204 to retrieve, with the communication circuit 205, information from the Internet to answer the question. Consequently, this voice command can cause the one or more processors 204 to access an application module, such as a web browser, to search for the answer and then deliver the answer as audible output via an audio output of the output components 206. In short, in one embodiment the voice interface engine 202 acts as a voice assistant, listening for voice commands, processing the commands with the assistance of the one or more processors 204 and returning an output that is the result of the user's intent.

The voice interface engine 202 can include a voice synthesizer to produce audible responses from the output components 206, which can include a speaker, loudspeaker, or other acoustic signal generation device. One or both of the voice interface engine 202 or the one or more processors 204 can further perform text-to-voice conversion operations and voice-to-text conversion operations as well. Certain functions such as the text-to-voice conversion and a voice-to-text conversion can alternatively be performed in conjunction with a remote server via the communication circuit 205.

The communication circuit 205 can include wireless communication circuitry, one of a receiver, a transmitter, or transceiver, and one or more antennas 207. In one or more embodiments, the communication circuit 205 is capable of communicating with one or more remote devices across a wide area network, local area network, small local area network (piconet), or personal area networks.

Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. Examples of local area networks include HomeRF, Bluetooth.sup.™, and IEEE 802.11 (a, b, g or n) or other similar Wi-Fi networks.

In one or more embodiments, the user interface 201, the voice interface engine 202, and the communication circuit 205 collectively define a communication interface of the electronic device (101). These components allow for the communication of information with the electronic device (101). The user interface 201 receives touch, gesture, or other direct input from a user, while the voice interface engine 202 receives voice input from the user. The communication circuit 205 can receive electromagnetic communications from electronic devices.

It should be noted that the voice interface engine 202 can be disposed locally on the electronic device (101) in one or more embodiments. Alternatively, the voice interface engine 202 can reside on a remote electronic device, such as a server in the cloud. Illustrating by example, in one or more embodiments voice commands are received by the electronic device and are simply converted to digital signals with an analog to digital converter. These digital signals can then be delivered with the communication circuit 205 across a network to another electronic device where the voice interface engine 202 resides. The voice interface engine 202 can perform analysis on the digital signals, and then return them to the communication circuit 205. Thus, the voice interface engine 202 can either reside locally within the electronic device (101) or remotely on a server or other electronic device in one or more embodiments.

One or more processors 204 are operable with the communication circuit 205. The one or more processors 204 are responsible for performing the various functions of the device. The one or more processors 204 can be a microprocessor, a group of processing components, one or more Application Specific Integrated Circuits (ASICs), programmable logic, or other type of processing device. The one or more processors 204 can be operable with the user interface 201 and the voice interface engine 202, as well as various peripheral devices, ports, or connectors.

The one or more processors 204 can be configured to process and execute executable software code to perform the various functions of the electronic device. A storage device, such as memory 203, stores the executable software code used by the one or more processors 204 for device operation. The executable software code used by the one or more processors 204 can be configured as one or more modules 208 that are operable with the one or more processors 204. Such modules 208 can store instructions, control algorithms, and so forth.

In one embodiment, the one or more processors 204 are responsible for running the operating system environment of the electronic device. The operating system environment can be configured as executable code operating on one or more processors 204 or control circuits of the electronic device. The operating system environment can include a kernel, one or more drivers, and one or more layers of a protocol stack. These layers can include an application service layer, a network layer, a physical layer, a protocol layer, an application layer, and other layers, such as an anti-collision layer and a transfer layer. Each layer can operate in accordance with one or more activity parameters.

In one embodiment, the physical layer is the top-level layer of the protocol stack, known as "layer 1," with the other layers above the physical layer. For example, in one embodiment the protocol stack includes the physical layer as the top layer, a data link layer as the second layer, the network layer as layer three, a transport layer as the fourth layer, a session layer as the fifth layer, the presentation layer as the sixth layer, and an application layer as the seventh layer.

The one or more processors 204 can also be operable with other components. The other components can include input components 209, such as an acoustic detector, microphone 210, image capture device, or other input device. In one or more embodiments, the microphone 210 can be accompanied by an ultrasound sensor. Where, for example, negotiations between electronic devices employ ultrasound waves, a receiver of an ultrasound sensor can be finely tuned to receive ultrasound frequencies, thereby enhancing the performance of the microphone 210. In other embodiments, the microphone 210 alone is configured to receive both audible and ultrasound frequencies.

The input components 209 can also include one or more proximity sensors to detect the presence of nearby objects. The input components 209 may include video input components such as optical sensors, mechanical input components such as buttons, touch pad sensors, touch screen sensors, capacitive sensors, motion sensors, and switches. The input components 209 can also include an energy storage device 212, such as a rechargeable electrochemical cell, a super capacitor, or other energy storage device. As will be shown in more detail below, in one or more embodiments electronic devices can determine which device will perform a control operation in a voice command based upon the amount of energy stored within the energy storage device 212.

Similarly, the other components can include output components 206 such as video, audio, and/or mechanical outputs. Other examples of output components 206 include audio output components such as loudspeaker(s) 211 or other alarms and/or buzzers and/or a mechanical output component such as vibrating or motion-based mechanisms. As with the microphone 210, the loudspeaker 211 can be accompanied by an ultrasound sensor. A transducer of the ultrasound sensor can be finely tuned to emit ultrasound frequencies, thereby enhancing the performance of the loudspeaker 211. In other embodiments, the loudspeaker 211 alone is configured to emit both audible and ultrasound frequencies. The acoustic devices of the input components 209 and the output components, e.g., the microphone 210 and the loudspeaker 211, define an audio interface for the electronic device in one or more embodiments.

It is to be understood that the electronic devices (101, 102, 103, 104, 105, 106) of FIG. 1 and the schematic block diagram 200 of FIG. 2 are provided for illustrative purposes only and for illustrating components of explanatory electronic devices configured in accordance with one or more embodiments of the disclosure. Neither figure is intended to represent a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
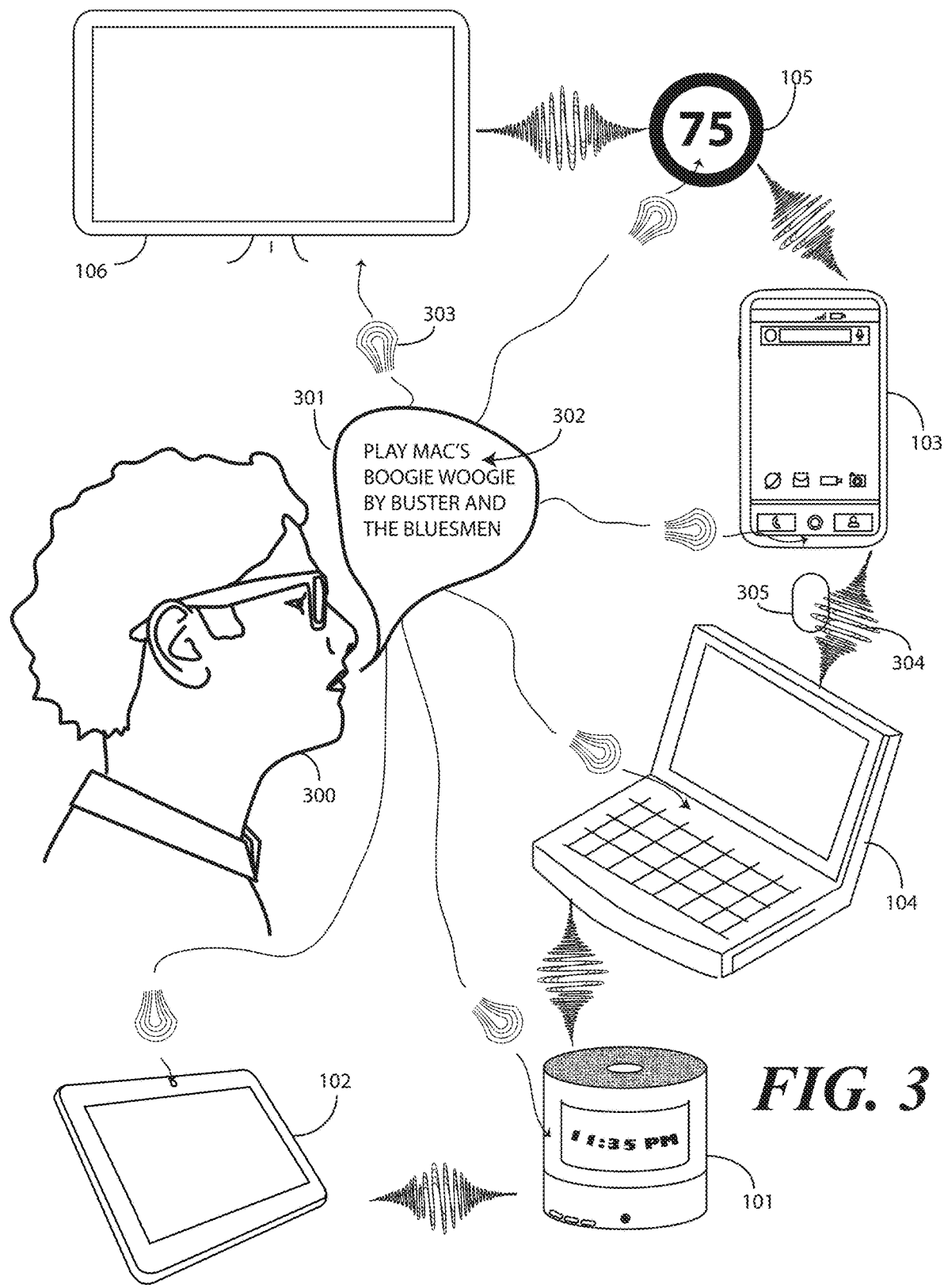
FIG. 3 illustrates one or more method steps occurring in an explanatory system configured in accordance with one or more embodiments of the disclosure.

Turning now to FIG. 3, the illustrative electronic devices 101, 102, 103, 104, 105, 106 are shown operating within a predefined environment. The predefined environment may be a person's home, office, workspace, or other location in which the voice interface engines (202) of the electronic devices 101, 102, 103, 104, 105, 106 are operable to receive voice commands 301 from a user 300.

As shown in FIG. 3, the user 300 is delivering a voice command 301 requesting that an electronic device perform a control operation 302. In this illustration, the control operation 302 comprises a request to play music, as the user 301 states, "Play Mac's Boogie Woogie by Buster and the Bluesmen," with "Mac's Boogie Woogie" being the name of a song by the legendary band, Buster and his Bluesmen.

Note that while the illustrative command shown in FIG. 3 is a voice command 301 coming from a user 300, embodiments of the disclosure are not so limited. In other embodiments, the command can be from another electronic device across a network. Illustrating by example, in one embodiment the command comprises an incoming message, such as an email or text message received with the communication circuit (205) across a network. When received, the control operation may be for an electronic device to read the message aloud using the voice assistant feature. When this occurs, the negotiation described below can occur in the same way as when the command comprises a voice command 301 from a user. For simplicity, a voice command 301 will be used for illustration. However, it should be noted that the voice command 301 can be replaced with electronic commands unless otherwise described.

Regardless of whether the command is an electronic command or a voice command 301, it is received by each electronic device 101, 102, 103, 104, 105, 106. Continuing with the example of the voice command 301, this voice command 301 includes a request for electronic devices 101, 102, 103, 104, 105, 106 operational within the predefined environment of FIG. 3 to perform the control operation 302 therein. This request for a control operation 302 is delivered as audible acoustic signals 303 to each electronic device 101,102,103,104,105,106 in this illustrative embodiment.

In this illustrative embodiment, each electronic device 101,102,103,104,105,106 has access to the song Mac's Boogie Woogie. Moreover, the user 300 has not been specific about which electronic device 101,102,103,104, 105,106 he desires to play the song. Accordingly, each electronic device 101,102,103,104,105,106, having its own voice interface engine (202), could simultaneously start playing the song in response to the voice command 301. This is undesirable. Advantageously, embodiments of the disclosure provide a solution to this dilemma by providing a negotiation technique that requires only the microphone (210) and loudspeaker (211) of each electronic device 101, 102,103,104,105,106. No additional hardware is required.

In one or more embodiments, each electronic device 101,102,103,104,105,106 receives, with its audio interface, the audible acoustic signals 303. These audible acoustic signals 303, referred to as "first" acoustic signals in this example, identify the voice command 301 to perform the control operation 302.

Since electronic device 101,102,103,104,105,106 is capable of responding to the voice command 301, in one or more embodiments the electronic devices 101,102,103,104, 105,106 negotiate whether to perform the control operation 302. In one or more embodiments, the electronic devices 101,102,103,104,105,106 execute this negotiating operation by sending and receiving second acoustic signals 304 using their audio interfaces. In one or more embodiments, these second acoustic signals 304 comprise signals that are inaudible. Said differently, in one or more embodiments the second acoustic signals 304 are at frequencies that are imperceptible by a person. However, these second acoustic signals 304 carry data that can be received by the voice assistants of the other electronic devices to perform the operation of negotiation.

Illustrating by example, in one or more embodiments the second acoustic signals 304 carry data with frequencies that are outside of the range that is normally perceptible by a human. In one embodiment, these frequencies are either below, say, 20 Hertz, or above, say, 20,000 Hertz. For instance, in one embodiment the second acoustic signals 304 comprise ultrasound acoustic signals that carry data perceptible by the other electronic devices. In another embodiment, the second acoustic signals 304 comprise infrasound acoustic signals that carry data perceptible by the other electronic devices. Other examples of inaudible acoustic signals will be obvious to those of ordinary skill in the art having the benefit of this disclosure. Accordingly, in one or more embodiments the electronic devices 101,102,103,104,105, 106 negotiate whether to perform the control operation 302 by sending and receiving the second acoustic signals 304 to and from other electronic devices operating within the predefined environment. Each of these second acoustic signals 304 carries data that can be identified by a voice assistant of an electronic device and acted upon by the processors operable with the voice assistant.

The negotiation occurring through the use of the second acoustic signals 304 can take several different forms. Illustrating by example, in one or more embodiments each electronic device 101,102,103,104,105,106 can determine which one of the electronic devices will respond as a function of a negotiating factor 305. For instance, in one embodiment the negotiating factor 305 can comprise one or more hardware capabilities of each electronic device 101, 102,103,104,105,106. If, for example, the voice command 301 included a control operation to play a movie, the music player may lack a screen on which to display such content. The same is true for the smart thermostat. Accordingly, the negotiation with the second acoustic signals 304 may result in a conclusion that neither the smart thermostat nor the smart music player should perform the control operation 302. These electronic devices 101,105 would therefore be released from performing the control operation 302.

Another example of a negotiating factor is the latency at which the electronic devices 101,102,103,104,105,106 can respond. If, for example, the smartphone's processor is loaded at a high capacity, but the tablet computer is running at a low capacity, the negotiation with the second acoustic signals 304 may result in a conclusion that the smartphone should not perform the control operation 302. Other negotiation factors 305 and functions will be described below with reference to FIG. 7. Still others will be obvious to those of ordinary skill in the art having the benefit of this disclosure.

It should be noted that, prior to executing a negotiation, in at least one embodiment each electronic device 101,102, 103,104,105,106 needs to be aware that other electronic devices 101,102,103,104,105,106 are operating within the predefined environment. Accordingly, in one or more embodiments the second acoustic signals 304 can be used to detect other electronic devices.

In one or more embodiments, each electronic device 101,102,103,104,105,106 can use the second acoustic signals 304 to periodically transmit an acoustic device discovery beacon. This device discovery beacon can comprise information corresponding to a device name, such as a MAC address, of a particular electronic device in accordance with an acoustically transmitted discovery protocol.

When the discovery beacon is received by another electronic device, the two electronic devices can use the second acoustic signals 304 to engage in various data transactions to perform a pairing procedure. For example, in response to receipt of the device discovery beacon, the second electronic device can respond using the second acoustic signals 304. This response can initiate a bi-directional, acoustically based, data exchange to establish the peer-to-peer acoustic communication link.

Figure 4:
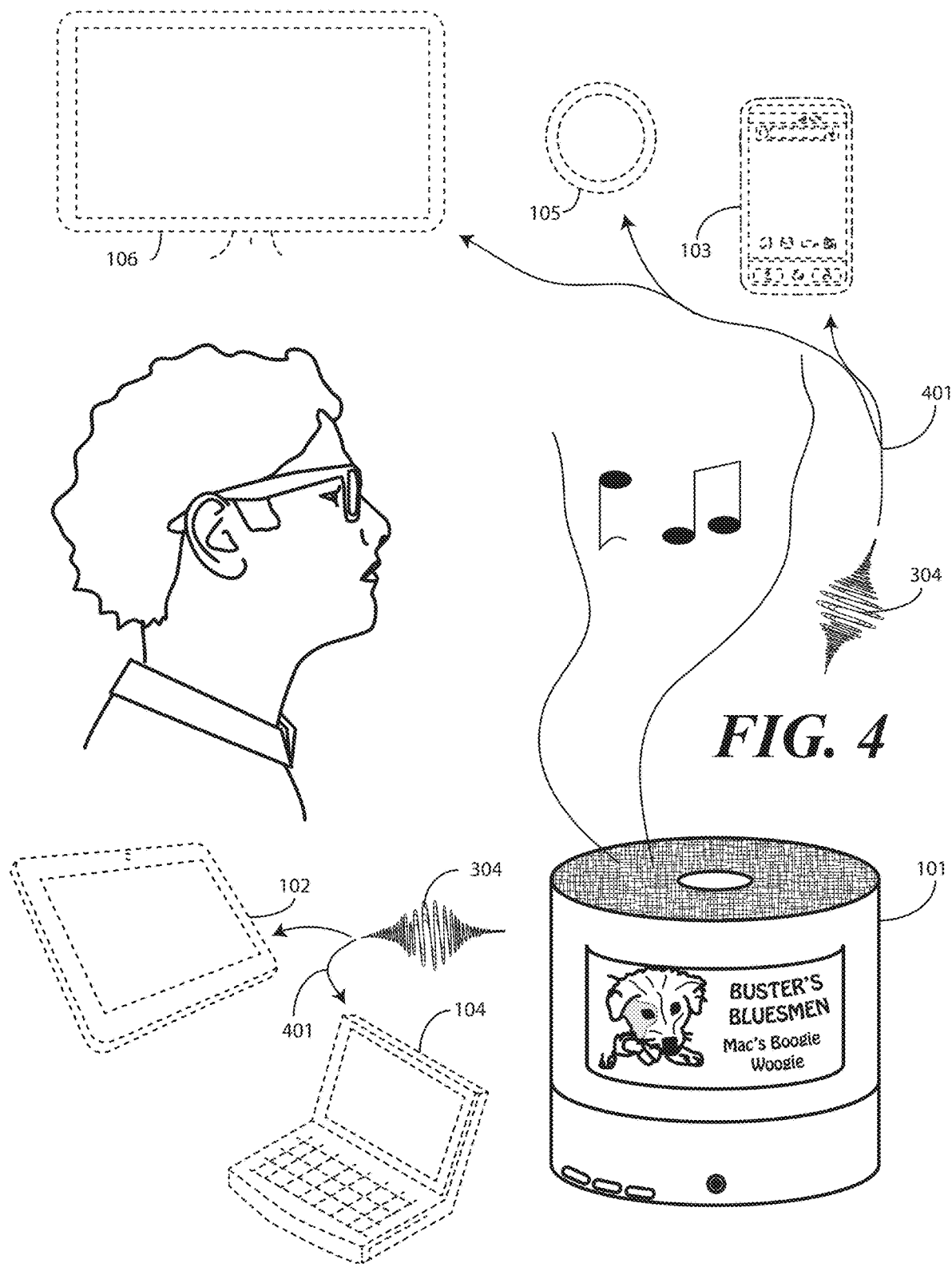
FIG. 4 illustrates one or more method steps occurring in an explanatory system configured in accordance with one or more embodiments of the disclosure.

Turning now to FIG. 4, in one or more embodiments, the electronic devices 101,102,103,104,105,106 identify, from the negotiation with the second acoustic signals 304, which electronic device will perform the control operation. In this example, the control operation (302) was that of playing a song. In this illustrative embodiment, the negotiating with the second acoustic signals 304 included determining which of the electronic devices 101,102,103,104,105,106 had the most appropriate hardware capability to perform the control operation. Since the music player is designed to delivery high fidelity music, this hardware capability was correlated with the control operation (302) of playing a song. The electronic devices 101,102,103,104,105,106 therefore, as a result of the negotiation, selected the music player as a function of the correlation of the control operation (302) and the hardware capability of the music player.

When this occurred, the music player, i.e., electronic device 101, determined, with its voice input engine, what the control operation (302) was by analyzing the first acoustic signals (303). The music player then performed, using its one or more processors (204), the control operation (302). As shown in FIG. 3, the music player began playing Mac's Boogie Woogie by Buster and the Bluesmen.

In one or more embodiments, this selection results in the remaining electronic devices 102,103,104,105,106 being released from performing the control operation (302).

Accordingly, each of these remaining electronic devices 102,103,104,105,106 is shown in dashed line in FIG. 4.

In one or more embodiments, the device performing the control operation (302), i.e., electronic device 101 in this example, can then notify 401, with the second acoustic signals 304, the remaining electronic devices 102,103,104, 105,106 that the electronic device 101 has performed the control operation (302). As shown in FIG. 4, the electronic device 101 does this by transmitting a message in the form of the second acoustic signals 304 to the remaining electronic devices 102,103,104,105,106.

Figure 5:
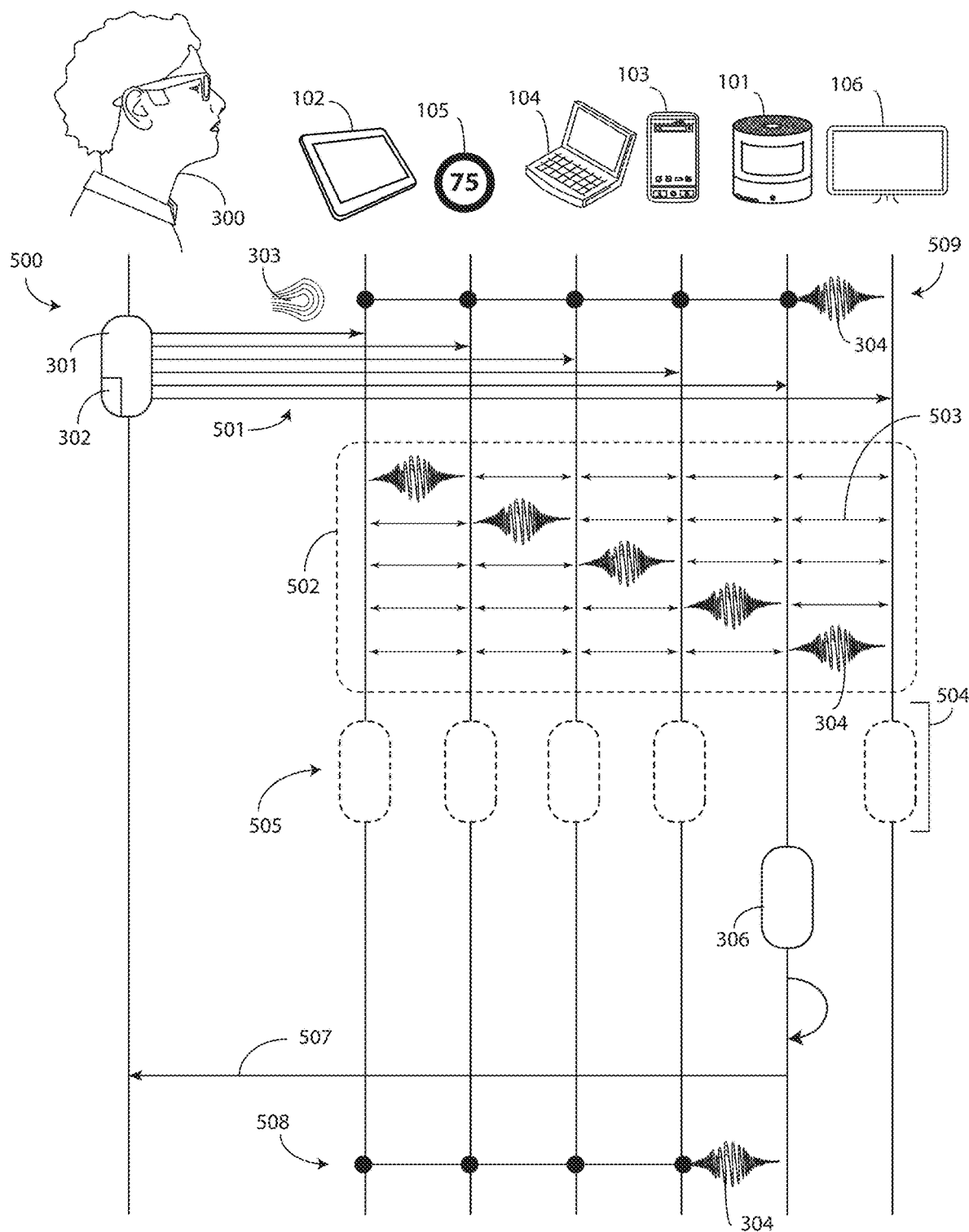
FIG. 5 illustrates one explanatory signal flow diagram in accordance with one or more embodiments of the disclosure.

Turning now to FIG. 5, illustrated therein is a signal flow diagram 500 illustrating one or more method steps occurring in FIGS. 3 and 4. The signal flow diagram 500 begins when the user delivers a voice command 301. In one or more embodiments, the voice command 301 includes an instruction or request to perform a control operation 302.

The audio interface of each electronic device 101,102, 103,104,105,106 operating within "earshot" of the voice command 301 then receives the voice command 301 in the form of acoustic signals 303, namely, the user's voice. Said differently, the audio interface of each electronic device 101,102,103,104,105,106 receives audible acoustic signals 303 in the form of the voice command 301 that identify the control operation 302 for the one or more processors (204) to perform.

At block 502, the one or more processors (204) of each electronic device 101,102,103,104,105,106 then exchange 503 second acoustic signals 304 to negotiate which electronic device of the electronic devices 101,102,103,104,105, 106 will perform the control operation 302. In one or more embodiments, the second acoustic signals 304 comprise ultrasound signals.

As noted above, this negotiation can take various forms. In one or more embodiments, the electronic devices 101, 102,103,104,105,106 identify which electronic device 101 will perform the control operation 302 as a function of one or more of hardware capabilities of each of the electronic device 101,102,103,104,105,106. In this example, since electronic device 101 is a dedicated music player and the control operation 302 was to play music, this hardware capability may be seen as being superior to other hardware capabilities of the remaining electronic devices 102,103, 104,105,106.

In another embodiment, the electronic devices 101,102, 103,104,105,106 identify which electronic device 101 will perform the control operation 302 as a function of loading of the one or more processors of each of the electronic devices 101,102,103,104,105,106. For example, a device with lesser loading may be prioritized over devices that have heavier loading.

In yet another embodiment, the electronic devices 101, 102,103,104,105,106 identify which electronic device 101 will perform the control operation 302 as a function of execution latency of each of the electronic devices 101,102, 103,104,105,106. For example, a device that can perform the control operation 302 more quickly may be prioritized over other devices that would be slower in responding.

In still another embodiment, the electronic devices 101, 102,103,104,105,106 identify which electronic device 101 will perform the control operation 302 as a function of an amount of stored energy within each of the electronic devices 101,102,103,104,105,106. For example, a device having a fully charged battery may be prioritized over one with a lesser-charged battery. Similarly, a device plugged into a wall outlet may be prioritized over a battery-powered device, and so forth. These functions are examples only that are included to demonstrate the various ways in which negotiations can be carried out. Still other functions will be described below with reference to FIG. 7, and even more will be obvious to those of ordinary skill in the art having the benefit of this disclosure.

In response to the negotiation, at step 504 the electronic devices 101,102,103,104,105,106 identify, from the second acoustic signals 304, which of the electronic devices 101, 102,103,104,105,106 will perform the control operation 302. In this embodiment, electronic devices 102,103,104, 105,106 are released 505 from performing the control operation 302. However, electronic device 101 performs 507 the control operation 302 by delivering output 507, here in the form of a song, to the user 300.

In one or more embodiments, the electronic device 101 performing the control operation 302 can optionally notify 508 the remaining electronic devices 102,103,104,105,106 that the control operation 302 has been performed. In one or more embodiments, this is done by sending communication data in the form of second acoustic signals 304 to the remaining electronic devices 102,103,104,105,106.

As noted above, prior to negotiating at step 501, in at least one embodiment each electronic device 101,102,103,104, 105,106 needs to be aware that other electronic devices 101,102,103,104,105,106 are operating within the predefined environment. Accordingly, in one or more embodiments the second acoustic signals 304 can be used to detect other electronic devices. For example, at step 509 the electronic devices 101,102,103,104,105,106 detect at least one other electronic device by receiving the second acoustic signals 304 from other electronic devices 101,102,103,104, 105,106.

Figure 6:
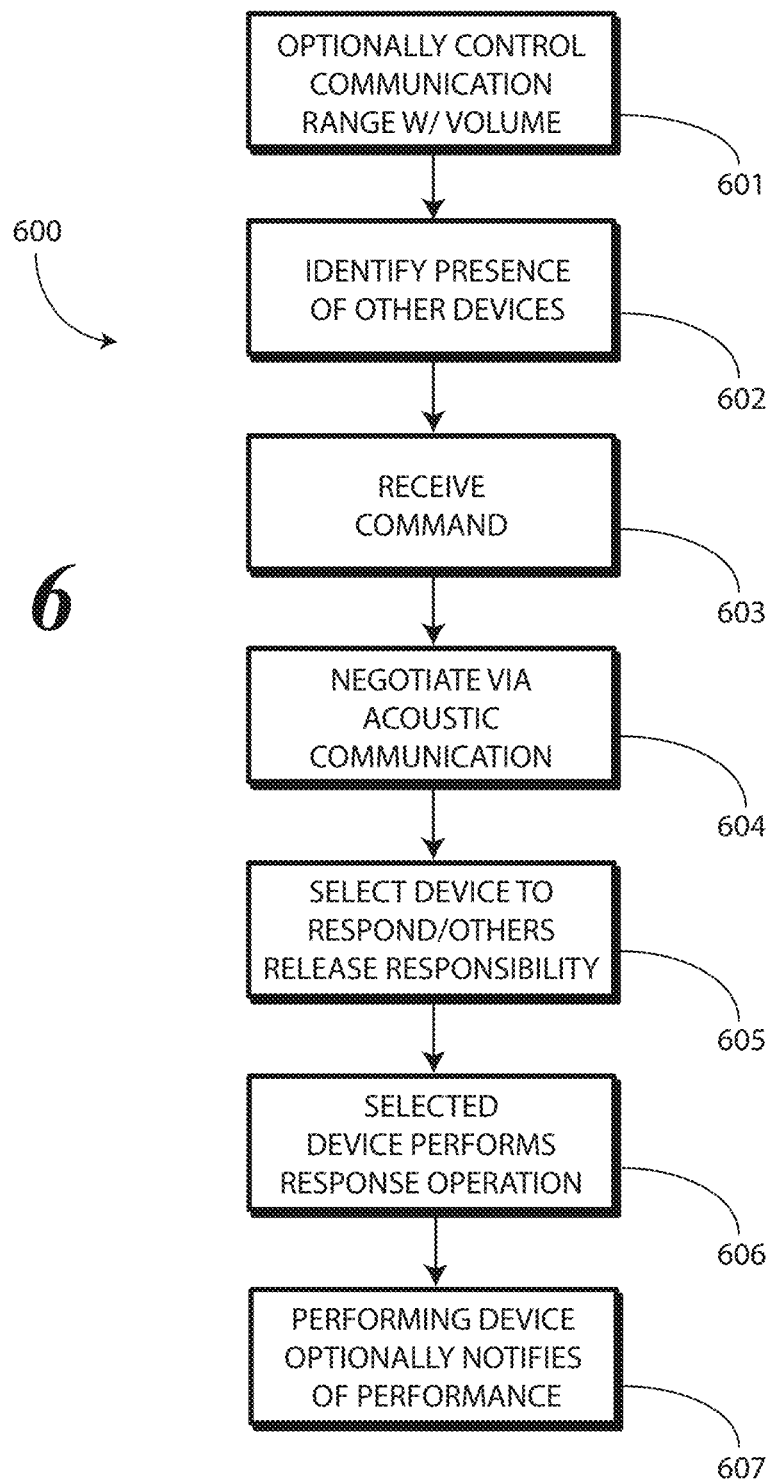
FIG. 6 illustrates one explanatory method in accordance with one or more embodiments of the disclosure.

Turning now to FIG. 6, illustrated therein is one explanatory method 600 in accordance with one or more embodiments of the disclosure. The method 600 can be used to perform the functions shown in FIGS. 2 and 3, or alternatively in the signal flow diagram (500) of FIG. 5 as well in one or more embodiments.

Beginning at step 601, the method 600 can optionally include limiting the distance within which other devices can reliably receive any ultrasound or other inaudible acoustic signals transmitted between electronic devices. In one or more embodiments, this is done by limiting a volume of transmitted second acoustic signals so as to define a predefined range within which any communication or negotiating will occur. Thus, in one embodiment step 601 includes limiting, with the audio interface, a volume of the ultrasound or inaudible acoustic signals, thereby defining a predefined range within which the at least one other electronic device can receive the ultrasound or inaudible acoustic signals.

Illustrating by example, turning now back to FIG. 2, in the previously described example each of the electronic devices 101,102,103,104,105,106 could reliably receive the second acoustic signals 304 from each other electronic device 101,102,103,104,105,106. However, assume that electronic devices 101,102,103,104,105 are within fifteen feet of each other, while electronic device 106 is forty feet from each of electronic devices 101,102,103,104,105. If each electronic device 101,102,103,104,105 reduces its volume, only those within the fifteen-foot radius will be able to reliably receive the second acoustic signals 304 from each other. Effectively, electronic device 106 will be "out of earshot" from electronic devices 101,102,103,104,105 due to the reduced volume of the second acoustic signals 304 emitted by these electronic devices 101,102,103,104,105.

This reduction of volume can be advantageous as it allows a user to define a predefined distance about any one electronic device that the second acoustic signals 304 will be received. Advantageously, this allows the user to define "zones" within which the electronic devices 101,102,103, 104,105,106 can communicate. Illustrating by example, if a user wants only devices on the second floor of a home to communicate with each other to determine which will respond to a voice command, this can be done by limiting the volume of the inaudible acoustic signals, thereby limiting the range within which such signals can be reliably received. Devices downstairs simply will not be able to hear the devices upstairs due to the reduced volume. Other advantages from the reduced volume control mechanism will be obvious to those of ordinary skill in the art having the benefit of this disclosure.

Turning now back to FIG. 6, at step 602 the method 600 includes detecting at least one other electronic device is operating within a defined radius of an electronic device by receiving acoustic signals from the other electronic device. As noted above, this defined radius can be limited at step 601. In one embodiment, the acoustic signals received at step 602 comprise inaudible acoustic signals. One example of such inaudible acoustic signals is ultrasound acoustic signals.

In one or more embodiments, step 602 can include using the ultrasound signals to transmit and/or receive an acoustic device discovery beacon. This device discovery beacon can comprise information corresponding to a device name, such as a MAC address, of a particular electronic device in accordance with an acoustically transmitted discovery protocol. In one embodiment, when the discovery beacon is received at step 602, this can initiate exchange of the ultrasound signals to engage in various data transactions to perform a pairing procedure to initiate a bi-directional, acoustically based, data exchange to establish the peer-to-peer acoustic communication link.

At step 603, the method 600 includes receiving, at a communication interface of the electronic device, a command to perform a control operation. As noted above, this command can be in the form of an electronic command received by the communication device. It can be a user command received by the user interface of the electronic device, such as by a user interacting with a user actuation target on the display.

In one or more embodiments, the command is a voice command received with an audio interface of an electronic device. In one or more embodiments, the voice command comprises acoustic signals identifying a user command to preform a control operation. In one embodiment, the acoustic signals received at step 603 comprise audible acoustic signals. For example, the acoustic signals received at step 603 can simply be the sounds of the voice of a user.

At step 604 the method 600 includes negotiating whether to perform the control operation. In one or more embodiments, the negotiating occurring at step 604 occurs when the audio interface of each electronic device sends and receives the ultrasound or inaudible acoustic signals to and from at least one other electronic device. These ultrasound or other inaudible acoustic signals can represent data exchanged by the various devices to communicate. Advantageously, the exchange of data through ultrasound or other inaudible acoustic signals requires only the use of a microphone and speaker, each of which is inherent in any device having a voice assistant.

In one or more embodiments, the negotiation of step 604 occurs using ultrasound acoustic waves. In one or more embodiments, these ultrasound acoustic waves have a frequency that is above 22 kilohertz. Such ultrasound waves facilitate both communication among electronic devices and the negotiation of step 604. Where each electronic device broadcasts ultrasonic acoustic waves with its microphone before and after its response, other devices can use the data stored therein to identify which electronic device will perform the control operation and which devices can be released from the responsibility of performing the control operation.

Figure 7:
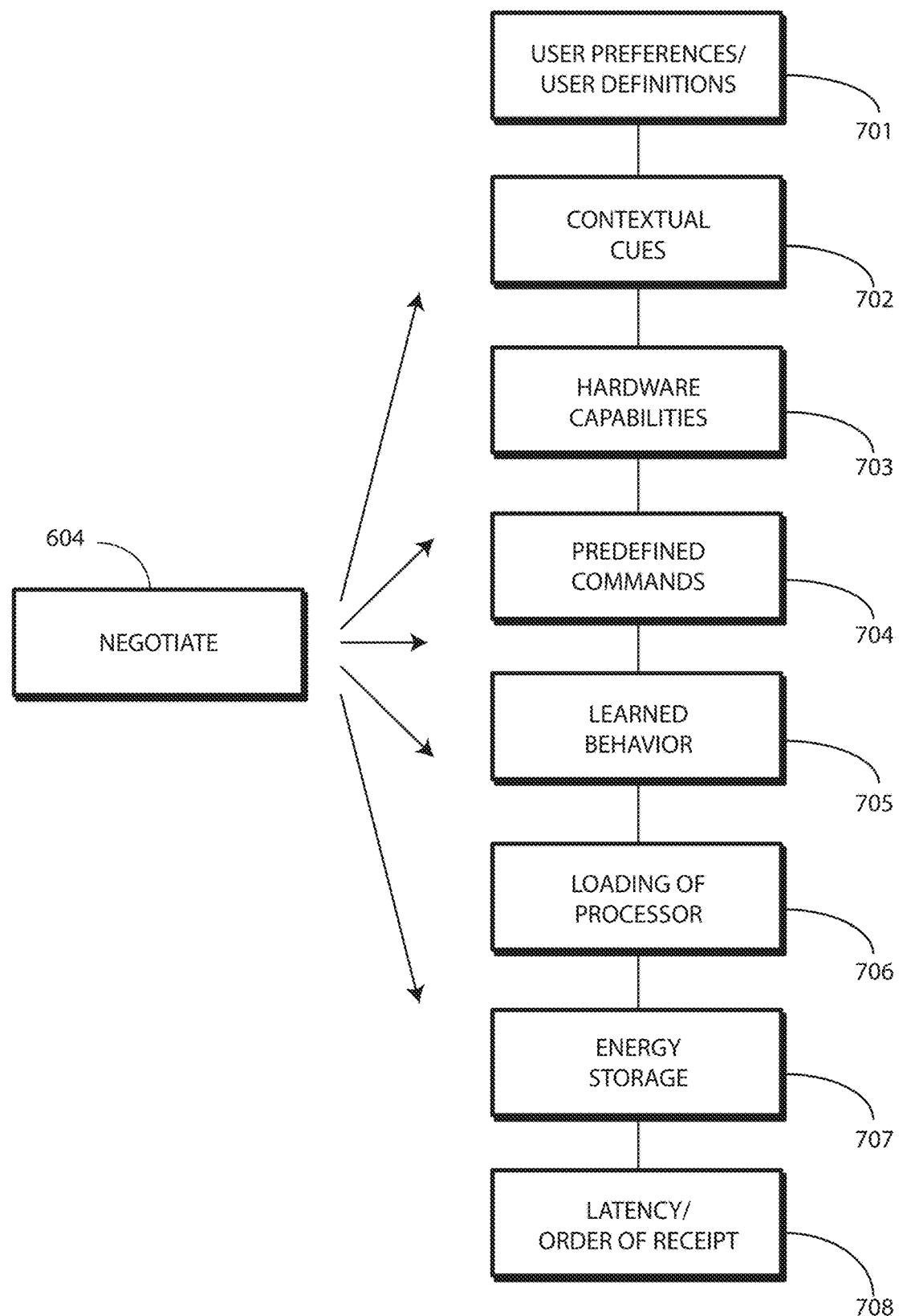
FIG. 7 illustrates one or more method steps in accordance with one or more embodiments of the disclosure.

As noted above, this negotiation can determine which electronic device should perform the control operation in a variety of ways. Turning now to FIG. 7, illustrated therein are a few ways that the negotiation of step 604 can occur. Still others will be obvious to those of ordinary skill in the art having the benefit of this disclosure.

Beginning with option 701, in one or more embodiments the negotiation occurring at step 604 can occur as a function of user definitions. Illustrating by example, a user may desire for only a music player to play music, and only a television to play movies. As a simpler example, the user may only want a thermostat to change temperature. Electronic devices configured in accordance with embodiments of the disclosure include a user interface (201) where such user preferences can be defined. Accordingly, a negotiation in response to the voice command "turn on the heat" would result in the thermostat performing this control operation in one embodiment.

Moving to option 702, in one or more embodiments the negotiation occurring at step 604 can occur as a function of one or more contextual cues found in the voice command. Illustrating by example, if the control option requested is to play a movie, and only a subset of the electronic devices receiving the control operation have displays, in one or more embodiments the negotiation occurring at step 604 will eliminate the electronic devices without screens, and so forth.

Turning to option 703, in one or more embodiments the negotiation occurring at step 604 can occur as a function of the hardware capabilities of the electronic devices. Thus, in one embodiment option 703 comprises determining at least one hardware capability of each of the electronic devices. In one embodiment, option 703 further includes correlating the at least one hardware capability with the control operation and selecting which electronic device will perform the control operation as a function of the correlating.

Illustrating by example, if a voice command is "How tall is the Willis Tower," this requires a retrieval of information from the Internet to answer the question. Consequently, in one or more embodiments the electronic devices may determine which has the fastest communication circuit and correlate the speeds with the voice command. They may select the electronic device with the fastest communication circuit to deliver the response.

Turning to option 704, in one or more embodiments the negotiation occurring at step 604 can occur as a function of the voice command itself. In one or more embodiments, option 704 comprises identifying, with a voice interface engine, a predefined command from the first acoustic signals and selecting which electronic device will perform the control operation as a function of the predefined command. Illustrating by example, in one or more embodiments the user may employ the name of a particular device in the voice command. For example, if the voice command states, "Play Mac's Boogie Woogie on my smartphone," the step 604 of negotiating may simply be the smartphone exchanging data with the other devices via the inaudible acoustic signals releasing them from responding.

Turning now to option 705, in one or more embodiments the negotiation occurring at step 604 can be a function of learned behavior by each of the devices. If, for example, a particular negotiation determines that a television should deliver content in response to a voice command, and the user corrects this action by issuing a subsequent voice command or other user input switching from the television to the music player, this activity can be stored in memory and associated with this particular form of content. Accordingly, when the user requests the content in the future, this learned behavior can be a factor or function in the step 604 of negotiating which device should perform the control operation of the voice command.

Turning now to option 706, in one or more embodiments the negotiation occurring at step 604 can be a function of the processor loading of each individual device. In one or more embodiments, option 706 comprises determining a processing loading amount of each electronic device and selecting which electronic device will perform the control operation as a function of the processing loading amount. Illustrating by example, if a smartphone is being heavily used, thereby excessively loading its processor, and a nearby tablet computer is idle, in one or more embodiments the step 604 of negotiating can result in the lesser loaded processor performing the control operation.

Turning now to option 707, in one or more embodiments the negotiation occurring at step 604 can be a function of a stored energy level of an energy storage device within the devices. In one or more embodiments, option 706 comprises determining a stored energy level of an energy storage device of each electronic device and selecting which electronic device will perform the control operation as a function of the stored energy level.

Illustrating by example, presume that three of five devices operating in a predefined embodiment are powered by energy storage devices such as lithium-ion batteries. The remaining two devices are powered by being plugged into an alternating current outlet. In such a situation, the negotiation occurring at step 604 may prioritize the plugged-in devices over the battery-powered devices so as not to deplete remaining stored energy. In another example, where all five devices are battery powered, the negotiation occurring at step 604 can be a function of selecting those with the most stored energy so as not to cause any one particular device to stop functioning due to a depleted battery.

Turning now to option 708, in one or more embodiments the negotiation occurring at step 604 can be a function of the speed at which the control operation can be performed. In one embodiment, option 708 comprises determining a latency at which the control operation can be performed for each electronic device and selecting which electronic device will perform the control operation as a function of the latency. Illustrating by example, if a particular device has a radio or data connection that is faster than another, and performance of a control operation requires retrieving content across a network from a remote device, the negotiation occurring at step 604 can be a function of selecting those with lesser latencies over those with longer latencies. This works to keep the amount of time required to perform the control operation to a minimum.

It is to be understood that the options 701,702,703,704, 705,706,707,708 of FIG. 7 are provided for illustrative purposes only, and are provided for illustrating just some of the ways in which the step 604 of negotiating can occur in accordance with one or more embodiments of the disclosure. These options 701,702,703,704,705,706,707,708 include selecting a device to perform a control operation as a function of the capability of the voice assistant and its corresponding electronic device (e.g., a shopping assistant voice assistant in a home shopping device may be more suited to performing goods ordering control operations than another device), the content and/or keywords of the voice command, other contexts gathered from the user, and/or which device can provide the fastest response (e.g., a "first come first serve approach" where the first voice assistant that broadcasts its inaudible acoustic signals performs the control operation, just to name a few of the ways in which the step 604 of negotiating can occur. This figure is not intended to represent a complete listing of options. Therefore, electronic devices in accordance with embodiments of the disclosure may employ other options in the step 604 of negotiating, or may include a combination of two or more options and still be within the scope of the present disclosure.

Moreover, some of the options 702,705,706,707,708 are dynamic, while other options 701,703,704 are more static in nature. Processor loading, shown at option 706, will change across time, and is therefore considered to be "dynamic." By contrast, user defined preferences, shown at element 701, may only be set once. In some embodiments, the negotiation occurring at step 604 comprises negotiating only the options 702,705,706,707,708 that are dynamic. This can be the case because the options 710,703,704 that are static can be negotiated one time only, remotely, or in the cloud. However, in other embodiments, any of the options 701,702,703, 704,705,706,707,708 of FIG. 7 can be negotiated at step 604, in any combination.

Turning now back to FIG. 6, at step 605 the method 600 can include identifying, from the negotiating occurring at step 604, and with one or more processors operable with the audio interface of each electronic device, which electronic device will perform the control operation found in the voice command received at step 602. In one or more embodiments, step 605 further includes determining, with a voice interface engine, what the control operation is from the acoustic signals defining the voice command that were received at step 602. In one or more embodiments, a voice interface engine analyzes the acoustic signals received at step 602 and identifies the control operation through voice-to-text, or voice-to-data, operations at step 605.

At step 606, the method 600 includes performing the control operation. In one or more embodiments, this performance occurring at step 606 is in response to the negotiating occurring at step 604. This is true due to the fact that the electronic device selected to perform step 606 was selected from the negotiating of step 604 at step 605.

It should be noted that the method steps of FIG. 6 can be performed in alternate order. Moreover, some of the method steps can overlap. Illustrating by example, embodiments of the disclosure contemplate that communication between electronic devices via ultrasound acoustic signals can occur at the same time that the voice assistants of each electronic device are receiving or delivering audible acoustic signals. Thus, for example, step 604 can occur simultaneously with step 603. Similarly, steps 604-607 can overlap one another. Accordingly, in one or more embodiments negotiating with ultrasound acoustic signals can occur while an electronic device is receiving, or delivering, audible acoustic signals in one or more embodiments.

At optional step 607, the method 600 can include notifying the other electronic devices that the electronic device selected in step 605 has performed the control operation. In one or more embodiments, this occurs by delivering data in the form of ultrasound or other inaudible acoustic signals to the other devices. This optional notification step 607 ensures that no control operation goes unperformed. Additionally, if the electronic device selected at step 605 is unable to perform the control operation due to a technical or other issue, another device can perform the control operation after failing to receive notice at step 607.

Thus, as shown and described with the steps shown in FIGS. 3-7, embodiments of the disclosure use ultrasound or other inaudible acoustic signals to initially identify the presence of electronic devices within a predefined environment and predefined radius defined by the volume at which those ultrasound or other inaudible acoustic signals are transmitted. Additionally, the ultrasound or other inaudible acoustic signals can be used to negotiate which electronic device performs a control operation in response to voice commands where those voice commands do not include an explicit identification of a particular device.

Additionally, the ultrasound or other inaudible acoustic signals can be used to identify which electronic device has performed the control operation, as well as which electronic devices are released from the responsibility of performing the control operation. Moreover, the step of negotiation can be performed as a function of one or more factors, such as the capability of the voice assistant, the capability of the device, the content and/or keywords of the voice command, other contexts gathered for the user, or on a first-come first-serve approach. Advantageously, by using only the microphone and speaker of each electronic device to perform these operations, the method steps of FIGS. 3-7 can be used where the same voice assistant is operating on different devices, where different voice assistants are operating on different devices, or combinations thereof.

Figure 8:
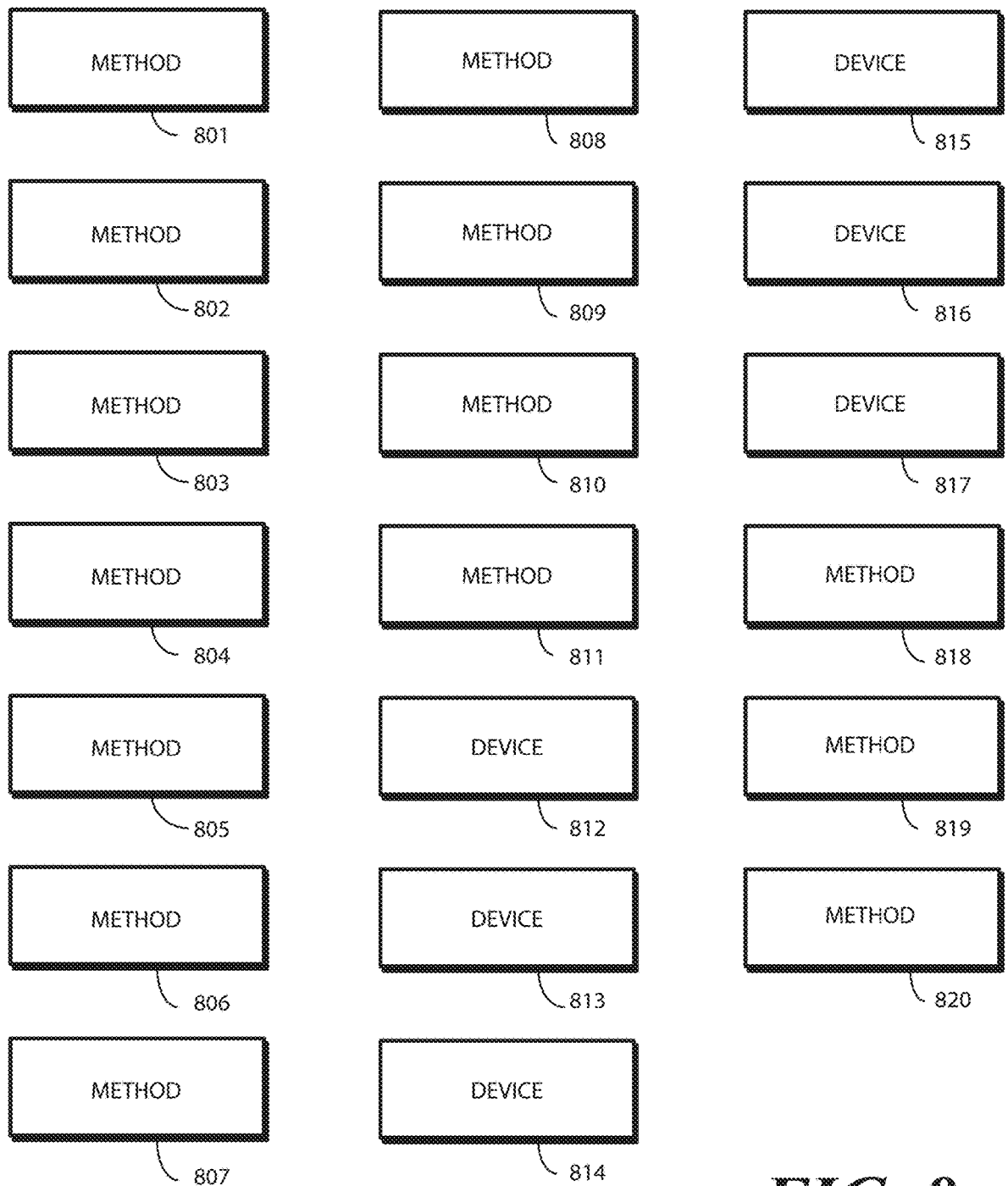
FIG. 8 illustrates various embodiments of the disclosure.

Turning now to FIG. 8, illustrated therein are various embodiments of the disclosure. At 801, a method in an electronic device comprises receiving, with a communication device of the electronic device, a command to perform a control operation. At 801, the method includes negotiating, by an audio interface sending and receiving first acoustic signals to and from at least one other electronic device, whether to perform the control operation. At 801, the method includes identifying from the negotiating, with one or more processors operable with the audio interface, which of the electronic device or the at least one other electronic device will perform the control operation.

At 802, the command of 801 comprises a voice command comprising second acoustic signals received at the audio interface. At 802, the first acoustic signals comprises inaudible acoustic signals, while the second acoustic signals of the voice command comprise audible acoustic signals. At 803, the inaudible signals of 802 comprise ultrasound signals.

At 804, the method of 802 comprises limiting, with the audio interface, a volume of the first acoustic signals, thereby defining a predefined range within which the at least one other electronic device can receive the first acoustic signals. At 805, the method of 802 further comprises determining, with a voice interface engine, the control operation from the second acoustic signals and performing, with the one or more processors, the control operation in response to the negotiating. At 806, the method of 805 further comprises notifying, with the first acoustic signals, the at least one other electronic device that the electronic device has performed the control operation.

At 807, the negotiating of 802 comprises determining at least one hardware capability of each of the electronic device and the at least one other electronic device. At 807, the negotiating of 802 comprises correlating the at least one hardware capability with the control operation. At 807, the negotiating of 802 comprises selecting which of the electronic device or the at least one other electronic device will perform the control operation as a function of the correlating.

At 808, the negotiating of 802 comprises determining a processing loading amount of each of the electronic device and the at least one other electronic device. At 808, the negotiating of 802 comprises selecting which of the electronic device or the at least one other electronic device will perform the control operation as a function of the processing loading amount.

At 809, the negotiating of 802 comprises determining a stored energy level of an energy storage device of each of the electronic device and the at least one other electronic device. At 809, the negotiating of 802 comprises selecting which of the electronic device or the at least one other electronic device will perform the control operation as a function of the stored energy level.

At 810, the negotiating of 802 comprises determining a latency at which the control operation can be performed for each of the electronic device and the at least one other electronic device. At 810, the negotiating of 802 comprises selecting which of the electronic device or the at least one other electronic device will perform the control operation as a function of the latency.

At 811, the negotiating of 802 comprises identifying, with a voice interface engine, a predefined command from the second acoustic signals. At 811, the negotiating of 802 comprises selecting which of the electronic device or the at least one other electronic device will perform the control operation as a function of the predefined command.

At 812, an electronic device comprises one or more processors, an audio interface, operable with the one or more processors, and a voice interface engine. At 812, the audio interface receives first acoustic signals identifying a control operation for the one or more processors. At 812, the one or more processors cause the audio interface to exchange second acoustic signals with at least one other electronic device, thereby negotiating which device will perform the control operation.

At 813, the second acoustic signals of 812 comprise ultrasound signals. At 814, the one or more processor of 812 further identify, from the second acoustic signals, which of the electronic device and the at least one other electronic device will perform the control operation.

At 815, the one or more processors of 814 identify which of the electronic device and the at least one other electronic device will perform the control operation as a function of one or more of hardware capabilities of each of the electronic device and the at least one other electronic device, processor loading of the each of the electronic device and the at least one other electronic device, control operation execution latency of the each of the electronic device and the at least one other electronic device, or stored energy within the each of the electronic device and the at least one other electronic device.

At 816, the one or more processors of 814 cause the negotiating while receiving the first acoustic signals. At 817 the one or more processors of 814 further limit a volume of transmitted second acoustic signals to define a predefined range within which the negotiating which device will perform the control operation.

At 818, a method in an electronic device comprises detecting at least one other electronic device by receiving first acoustic signals with an audio interface. At 818, the method includes receiving, with the audio interface, second acoustic signals identifying a voice command to perform a control operation. At 818, the method includes negotiating, by the audio interface with the first acoustic signals, whether the electronic device or the at least one other electronic device will perform the control operation. At 818, the first acoustic signals comprise inaudible acoustic signals. At 818, the second acoustic signals comprise audible acoustic signals.

At 819, the method of 818 further comprises identifying, from the negotiating, that the electronic device will perform the control operation, and performing, with one or more processors operable with the audio interface, the control operation. At 820, the method of 819 further comprises optionally notifying, with the first acoustic signals, the at least one other electronic device of performance of the control operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, with a communication device of the electronic device, a command to perform a control operation;
   negotiating, by an audio interface sending and receiving first acoustic signals to and from at least one other electronic device, whether to perform the control operation; and
   identifying from the negotiating, with one or more processors operable with the audio interface, which of the electronic device or the at least one other electronic device will perform the control operation;
   wherein the negotiating comprises:
      determining a processing loading amount of each of the electronic device and the at least one other electronic device; and
      selecting which of the electronic device or the at least one other electronic device will perform the control operation as a function of the processing loading amount.

2. The method of claim 1, wherein:
   the command comprises a voice command comprising second acoustic signals received at the audio interface;
   the first acoustic signals comprises inaudible acoustic signals; and
   the second acoustic signals of the voice command comprise audible acoustic signals.

3. The method of claim 2, the inaudible acoustic signals comprising ultrasound signals.

4. The method of claim 2, further comprising limiting, with the audio interface, a volume of the first acoustic signals, thereby defining a predefined range within which the at least one other electronic device can receive the first acoustic signals.

5. The method of claim 2, further comprising:
   determining, with a voice interface engine, the control operation from the second acoustic signals; and
   performing, with the one or more processors, the control operation in response to the negotiating.

6. The method of claim 5, further comprising notifying, with the first acoustic signals, the at least one other electronic device that the electronic device has performed the control operation.

7. The method of claim 2, wherein the negotiating further comprises:
   determining at least one hardware capability of each of the electronic device and the at least one other electronic device; and
   correlating the at least one hardware capability with the control operation; and
   wherein the selecting which of the electronic device or the at least one other electronic device will perform the control operation occurs further as a function of the correlating.

8. The method of claim 2, wherein the
   selecting comprises selecting an idle electronic device over another electronic device having a loaded processor to perform the control operation as a function of the processing loading amount.

9. The method of claim 2, wherein the negotiating further comprises:
   determining a stored energy level of an energy storage device of each of the electronic device and the at least one other electronic device;
   wherein the selecting which of the electronic device or the at least one other electronic device will perform the control operation occurs further as a function of the stored energy level.

10. The method of claim 2, wherein the negotiating further comprises:
    determining a latency at which the control operation can be performed for each of the electronic device and the at least one other electronic device;
    wherein the selecting which of the electronic device or the at least one other electronic device will perform the control operation occurs further as a function of the latency.

11. The method of claim 2, wherein the negotiating further comprises:
    identifying, with a voice interface engine, a predefined command from the second acoustic signals;
    wherein the selecting which of the electronic device or the at least one other electronic device will perform the control operation occurs further as a function of the predefined command.

12. An electronic device, comprising:
    one or more processors;
    an audio interface, operable with the one or more processors; and
    a voice interface engine;
    the audio interface receiving first acoustic signals identifying a control operation for the one or more processors; and
    the one or more processors causing the audio interface to exchange second acoustic signals with at least one other electronic device, thereby negotiating which device will perform the control operation;

the one or more processors causing the negotiating while receiving the first acoustic signals.

13. The electronic device of claim 12, the second acoustic signals comprising ultrasound signals.

14. The electronic device of claim 12, the one or more processors further identifying, from the second acoustic signals, which of the electronic device and the at least one other electronic device will perform the control operation.

15. The electronic device of claim 14, the one or more processors identifying which of the electronic device and the at least one other electronic device will perform the control operation as a function of one or more of hardware capabilities of each of the electronic device and the at least one other electronic device, processor loading of the each of the electronic device and the at least one other electronic device, control operation execution latency of the each of the electronic device and the at least one other electronic device, or stored energy within the each of the electronic device and the at least one other electronic device.

16. The electronic device of claim 14, first acoustic signals comprising a voice command.

17. The electronic device of claim 14, the one or more processors further limiting a volume of transmitted second acoustic signals to define a predefined range within which the negotiating which device will perform the control operation.

18. A method in an electronic device, the method comprising:

receiving, with a communication device of the electronic device, a command to perform a control operation;

negotiating, by an audio interface sending and receiving first acoustic signals to and from at least one other electronic device, whether to perform the control operation; and identifying from the negotiating, with one or more processors operable with the audio interface, which of the electronic device or the at least one other electronic device will perform the control operation;

wherein the negotiating comprises:

determining a stored energy level of an energy storage device of each of the electronic device and the at least one other electronic device; and selecting which of the electronic device or the at least one other electronic device will perform the control operation as a function of the stored energy level.

19. The method of claim 18, wherein:

the command comprises a voice command comprising second acoustic signals received at the audio interface;

the first acoustic signals comprises inaudible acoustic signals; and the second acoustic signals of the voice command comprise audible acoustic signals.

20. The method of claim 19, the inaudible acoustic signals comprising ultrasound signals.

* * * * *